United States Patent [19]
Etherington

[11] 3,742,079
[45] June 26, 1973

[54] OXIDATIVE DEHYDROGENATION OF ETHYLBENZENE TO STYRENE USING A GOLD ON TITANIA CATALYST

[75] Inventor: Robert W. Etherington, Pennington, N.J.

[73] Assignee: Mobil Oil Corporation, New York, N.Y.

[22] Filed: June 30, 1971

[21] Appl. No.: 158,535

[52] U.S. Cl............................................. 260/669 R
[51] Int. Cl............................................. C07c 15/10
[58] Field of Search .................... 260/669 R, 680 E

[56] References Cited
UNITED STATES PATENTS 3,553,220  1/1971  Etherington et al................ 260/290
3,156,735  11/1964  Armstrong...................... 260/680 E
3,223,743  12/1965  MacFarlane..................... 260/669 R
3,476,808  11/1969  Etherington et al............... 260/586

Primary Examiner—Curtis R. Davis
Attorney—Oswald G. Hayes, Hastings S. Trigg et al.

[57] ABSTRACT

Styrene is prepared from ethylbenzene by contacting a mixture of ethylbenzene oxygen-containing gas and an inert diluent with a catalyst consisting of gold supported on or admixed with titania, at an elevated temperature.

5 Claims, No Drawings

OXIDATIVE DEHYDROGENATION OF ETHYLBENZENE TO STYRENE USING A GOLD ON TITANIA CATALYST

BACKGROUND OF THE INVENTION

1. Field of the Invention

The present invention provides a process for the oxidative dehydrogenation of ethylbenzene to styrene.

2. Description of the Prior Art

It has been proposed to carry out an oxidative dehydrogenation reaction using a catalyst comprising gold on a low surface area inert support. Such patents are directed to oxidative dehydrogenation of ketones (U. S. Pat. No. 3,476,808) and alkyl pyridines (U. S. Pat. No. 3,553,220). In U. S. Pat. No. 3,156,735, it is proposed to carry out oxidative dehydrogenation using as the catalyst a gold alloy with a platinum or palladium metal on a low surface area support. Dehydrogenation (not oxidative) of ethylbenzene to styrene is shown, in U. S. Pat. No. 3,233,743, to be carried out using iron, titanium or vanadium oxide promoted with an alkali metal salt.

SUMMARY OF THE INVENTION

This invention provides a process for preparing styrene that comprises contacting a mixture of ethylbenzene, oxygen-containing gas, and an inert diluent gas with a gold on titania catalyst at temperatures of between about 400° C. and about 800° C.

DESCRIPTION OF SPECIFIC EMBODIMENTS

The initial reactant in the process of this invention is ethylbenzene which is readily available commercially. It is also readily prepared as, for example, by alkylating benzene with ethylene. The ethylbenzene is charged to the process at an LHSV (the rate of liquid ethylbenzene charge per volume of catalyst per hour) of between about 0.1 and about 10, preferably between about 0.3 and about 3.

The oxygen-containing gas can be pure oxygen or gaseous mixtures containing oxygen such as air or mixtures of oxygen and nitrogen. The molar ratio of oxygen to ethylbenzene will be between about 0.01 and about 3, preferably between about 0.1 and about 1.0.

The preferred diluent is nitrogen or steam. Other inert diluent gases can be used, however, e.g., carbon dioxide or flue gas.

The catalyst used in the process of this invention is gold on titania ($TiO_2$). The amount of gold in the catalyst, based upon the weight of the finished catalyst, will be between about 0.01 weight percent and 50 weight percent, preferably between about 0.05 weight percent and about 10 weight percent. In general, any method known in the art for preparing supported metallic catalyst can be used. A particularly preferred method, used for preparing the catalysts in the examples, was to impregnate the surface of the titania with a solution of gold t-dodecyl mercaptide and a bismuth resinate flux dissolved in a mixture of esters and tall oil (a so-called "liquid gold") followed by calcining. This operation is repeated until the desired amount of gold is obtained. Other methods of preparation may be used, such as coating titania with other gold derivatives and calcining, or depositing the gold on titania powder and then forming the catalyst particles and calcining, or by co-precipitating metallic gold and titania hydrogel followed by forming catalyst particles and calcining. Another method is to impregnate a shaped titania particle with a gold salt and calcining to the metallic gold.

The temperature of reaction, i.e., the temperature of the catalyst bed will be between about 400° C. and about 800° C., preferably between about 550° C. and about 775° C. The reaction can be readily carried out at atmospheric pressure. It has been found, however, that process advantages may be realized by using a pressure of about 10 to 150 p.s.i.g.

The following Examples illustrate the process of this invention. In all the examples, ethylbenzene was pumped to a vaporizer and the vapors were mixed with a stream of air and of a diluent consisting of nitrogen or steam. The resulting mixture was passed through a pre-heater zone packed with inert pellets and then through a 70 cc. bed of catalyst packed in a ¾ inch I.D., stainless steel pipe reactor containing a concentric ¼ inch O.D. thermowell. The reactor was mounted vertically and the reactants flowed in a downward direction. The reactor was heated with an electric furnace. The exit gas mixture was passed through a series of condensers and liquid products were collected. The liquid products were analyzed by gas-liquid chromatography. All conversions and selectivities reported are in mole percent.

EXAMPLE 1

Ethylbenzene was fed to the reactor at the rate of 60.7 g./hr. along with air, 500 cc. per minute, and nitrogen diluent, 1500 cc. per minute. The catalyst consisted of 4% Au on ⅛ inch titania pellets of 65 $m^2$/gram surface area. The maximum temperature in the catalyst bed was 700° C. The liquid products contained 49.8 mole percent styrene, 47.1% ethylbenzene, 1.7% benzene, and 1.5% toluene. Ethylbenzene conversion was 52.9 percent and the selectivity was 94.0 percent to styrene.

EXAMPLE 2

When Example 1 was repeated with the maximum temperature in the catalyst bed raised to 750° C., the ethylbenzene conversion was 68.7 percent and the selectivity to styrene was 87.5 percent.

EXAMPLE 3

When Example 2 was repeated with air flow lowered to 250 cc. per minute and nitrogen flow raised to 1,750 cc. per minute, the ethylbenzene conversion was 61.4 percent and the selectivity to styrene was 90.8 percent.

EXAMPLE 4

When Example 3 was repeated with the pressure in the reactor raised to 15 p.s.i.g., the ethylbenzene conversion was 65.8 percent and the selectivity to styrene was 92.6 percent.

EXAMPLE 5

Under the conditions of Example 1, but using a catalyst consisting of 1 percent gold on titania, the conversion of ethylbenzene was 57.3 percent and selectivity to styrene was 95.9 percent.

EXAMPLE 6

When the temperature of the experiment of Example 5 was raised to 750° C., the ethylbenzene conversion was 68.2 percent and the selectivity to styrene was 92.7 percent.

At 775° C. the ethylbenzene conversion was 71.6 percent and selectivity to styrene was 89.9 percent.

EXAMPLE 7

When the conditions of Example 1 were used with the unmodified titania as catalyst, the ethylbenzene conversion was 36.7 percent and the selectivity to styrene was 87.7 percent.

When the maximum catalyst temperature was raised to 750° C., the ethylbenzene conversion was 59.9 percent and selectivity to styrene was 79.9 percent.

EXAMPLE 8

Under the conditions of Example 1, a catalyst consisting of 2.2 percent Au deposited on fused alumina spheres of ~1 m²/g. gave only 19.4 percent conversion of ethylbenzene with 82.0 percent selectivity to styrene.

When the maximum catalyst temperature was raised to 750° C. the conversion of ethylbenzene rose to 54.6 percent but selectivity to styrene was only 70.9 percent.

EXAMPLE 9

Under the conditions of Example 1, a catalyst consisting of 10 percent gold deposited on active alumina (~210 m²/gram) gave 36.8 percent conversion but only 78.2 percent selectivity to styrene.

When the maximum catalyst temperature was raised to 750° C., this catalyst gave 58.1 percent ethylbenzene conversion but only 71.6 percent selectivity to styrene.

EXAMPLE 10

Using steam as the diluent (70 g. $H_2O$/hour), 60.7 g. ethylbenzene per hour and 500 cc. of air per minute over a 1 percent Au-titania catalyst at 15 p.s.i.g. reactor pressure, a 59.2 percent ethylbenzene conversion was obtained at 700° C. with 88.6 percent selectivity to styrene.

At 750° C. the conversion of ethylbenzene was 71.5 percent and the selectivity to styrene was 89.0 percent.

EXAMPLE 11

When the experiment of Example 2 was repeated using a 0.5 percent Au on titania catalyst the ethylbenzene conversion was 70.0 percent and the selectivity to styrene was 85.7 percent.

At 700° C. the ethylbenzene conversion was 57.0 percent and the selectivity to styrene was 93.5 percent.

EXAMPLE 12

When a 0.1 percent Au on titania catalyst was used under the conditions of Example 1, the ethylbenzene conversion was 62.1 percent and the selectivity to styrene was 92.9 percent.

At a maximum temperature of 725° C. the ethylbenzene conversion was 69.7 percent and the selectivity to styrene was 90.7 percent.

For more ready reference, the runs described in the foregoing Examples are presented in tabular form. Table I presents pertinent data on the runs carried out using the catalyst of this invention.

TABLE I

Au on $TiO_2$

| Example | Catalyst Percent Au | Catalyst Carrier | Feed Ethylbenzene, g./hr. | Feed Air, cc./min. | Feed Nitrogen, cc./min. | Temp., °C. | Percent Conversion | Percent Selectivity | Styrene per pass |
|---|---|---|---|---|---|---|---|---|---|
| 1 | 4 | $TiO_2$ | 60.7 | 500 | 1,500 | 700 | 52.9 | 94.0 | 49.7 |
| 2 | 4 | $TiO_2$ | 60.7 | 500 | 1,500 | 750 | 68.7 | 87.5 | 60.1 |
| 3 | 4 | $TiO_2$ | 60.7 | 250 | 1,750 | 750 | 61.4 | 90.8 | 55.8 |
| 4 | 4 | $TiO_2$ | 60.7 | ¹250 | 1,500 | 750 | 65.8 | 92.6 | 60.9 |
| 5 | 1 | $TiO_2$ | 60.7 | 500 | 1,500 | 700 | 57.3 | 95.9 | 55.0 |
| 6 | 1 | $TiO_2$ | 60.7 | 500 | 1,500 | 750 | 68.2 | 92.7 | 63.3 |
|   | 1 | $TiO_2$ | 60.7 | 500 | 1,500 | 775 | 71.6 | 89.9 | 64.4 |
| 10 | 1 | $TiO_2$ | 60.7 | 500 | (²) | 700 | 59.2 | 88.6 | 52.5 |
|   | 1 | $TiO_2$ | 60.7 | 500 | (²) | 750 | 71.5 | 89.0 | 63.6 |
| 11 | 0.5 | $TiO_2$ | 60.7 | 500 | 1,500 | 750 | 70.0 | 85.7 | 60.0 |
|   | 0.5 | $TiO_2$ | 60.7 | 500 | 1,500 | 700 | 57.0 | 93.5 | 53.3 |
| 12 | 0.1 | $TiO_2$ | 60.7 | 500 | 1,500 | 700 | 62.1 | 92.9 | 57.7 |
|   | 0.1 | $TiO_2$ | 60.7 | 500 | 1,500 | 725 | 69.7 | 90.7 | 63.2 |

¹ Pressure was 15 p.s.i.g.
² Diluent was steam.

It will be noted that in all runs conversion and selectivity were both quite high. It is also to be noted that the percent of styrene obtained per pass was about 50 percent or higher. Table II presents pertinent data for runs carried out using catalysts other than those of the present invention.

TABLE II

Other Catalysts

| Example | Catalyst Percent Au | Catalyst Carrier | Feed Ethylbenzene, g./hr. | Feed Air, cc./min. | Feed Nitrogen, cc./min. | Temp., °C. | Percent Conversion | Percent Selectivity | Styrene per pass |
|---|---|---|---|---|---|---|---|---|---|
| 7 | None | $TiO_2$ | 60.7 | 500 | 1,500 | 700 | 36.7 | 87.7 | 32.2 |
|   | None | $TiO_2$ | 60.7 | 500 | 1,500 | 750 | 59.9 | 79.9 | 47.9 |
| 8 | 2 | $Al_2O_3$ | 60.7 | 500 | 1,500 | 700 | 19.4 | 82.0 | 15.9 |
|   | 2 | $Al_2O_3$ | 60.7 | 500 | 1,500 | 750 | 54.6 | 70.9 | 38.7 |
| 9 | 10 | $Al_2O_3$ | 60.7 | 500 | 1,500 | 700 | 36.8 | 78.2 | 28.8 |
|   | 10 | $Al_2O_3$ | 60.7 | 500 | 1,500 | 750 | 58.1 | 71.6 | 41.6 |

From the data in Table II, it will be noted that with titania alone, unmodified by gold, conversion and selectivity were low and the amount of styrene obtained per pass was less than 50 percent. Using gold on alumina, as shown in prior patents, the results were unsatisfactory, as compared to the results shown in Table I.

It will be appreciated, therefore, that the use of gold on titania specifically produces results that are not obtainable with other catalysts. It is another feature of this invention that the titania support should have a relatively high surface area in the order of between about 5 and about 100 m²/g.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A process for preparing styrene that comprises contacting a mixture of ethylbenzene, molecular oxygen-containing gas, and an inert diluent gas with a metallic gold supported on titania catalyst at temperatures of between about 400° C. and about 800° C.

2. The process of claim 1, wherein the process is carried out at a pressure of about 10 to about 150 p.s.i.g.

3. The process of claim 2, wherein said molecular oxygen-containing gas is air.

4. The process of claim 3, wherein said inert gas is nitrogen.

5. The process of claim 3, wherein said inert gas is steam.

* * * * *